United States Patent [19]

Rieben et al.

[11] Patent Number: 4,913,177
[45] Date of Patent: Apr. 3, 1990

[54] NUCLEAR FUEL ROD WIPING APPARATUS AND METHOD

[75] Inventors: Stuart L. Rieben, Mt. Lebanon Twp., Allegheny County, Pa.; Joseph J. Scherpenberg, Columbia, S.C.

[73] Assignee: Westinghouse Electric Corp., Pittsburgh, Pa.

[21] Appl. No.: 275,842

[22] Filed: Nov. 25, 1988

[51] Int. Cl.⁴ .............................................. B08B 9/02
[52] U.S. Cl. ......................................... 134/9; 15/88; 15/97 R; 15/104.04; 134/6
[58] Field of Search .................... 15/104.04, 97 R, 88; 134/6, 9; 118/DIG. 11

[56] References Cited

U.S. PATENT DOCUMENTS

| | | | |
|---|---|---|---|
| 2,231,135 | 2/1941 | Murray | 15/97 R |
| 2,305,755 | 12/1942 | Akahira | 15/104.04 X |
| 3,218,658 | 11/1965 | Collins et al. | 15/88 |
| 3,445,285 | 5/1969 | Nast et al. | 15/88 |
| 3,809,575 | 5/1974 | Yeo | 134/21 |
| 3,994,766 | 11/1976 | Dedels | 156/392 |
| 4,165,549 | 8/1979 | Wennerstrom et al. | 15/88 |
| 4,306,914 | 12/1981 | Long | 15/104.04 X |
| 4,496,519 | 1/1985 | McGuire | 376/316 |
| 4,566,203 | 1/1986 | Johnson | 15/97 R |
| 4,729,855 | 3/1988 | Murray et al. | 252/626 |

FOREIGN PATENT DOCUMENTS 52-19474 2/1977 Japan .
54-118979 9/1979 Japan .

Primary Examiner—Edward L. Roberts

[57] ABSTRACT

Tube wiping apparatus includes upper and lower reversely canted pinch rollers spaced along respective upper and lower sides of a first path along which the tube is moved and rotated by pairs of the upper and lower pinch rollers located at infeed and exit ends of the first path. The wiping apparatus also includes a toweling drive roll having an exterior surface engaging a toweling roll and carrying a continuous web of toweling along a second path, and a toweling pinch roll having an exterior surface pinching the toweling web between it and the drive roll for causing movement of the toweling web along the second path, across the first path and into contact with the tube so as to perform wiping of the exterior surface of the tube by the toweling. The drive roll with a yieldably resilient outer annular layer is disposed below a pair of the upper pinch rollers for capturing the tube therebetween as the tube is moved along the first path such that the roll outer layer and the toweling thereon are indented by contact with the tube causing the toweling to wrap partially around the tube exterior surface as wiping thereof occurs. A spray chamber is operable for applying a liquid spray to the tube to permit a wet wiping of the tube exterior surface by the toweling.

26 Claims, 5 Drawing Sheets

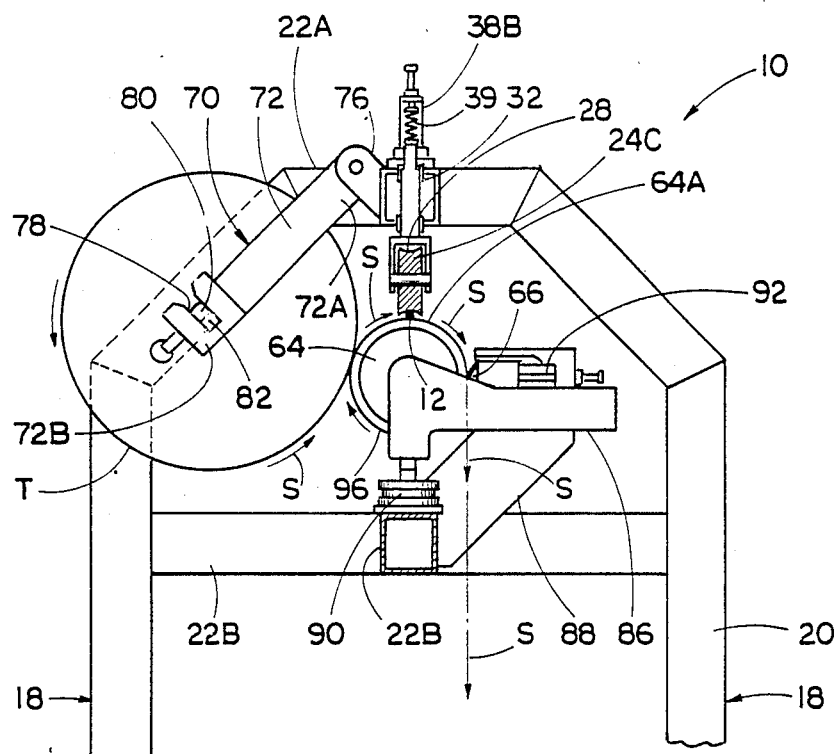
FIG. 5
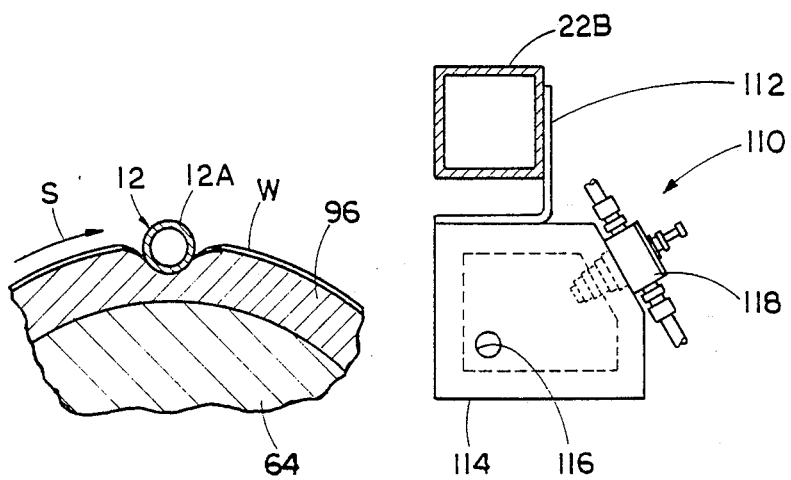
FIG. 7
FIG. 6

NUCLEAR FUEL ROD WIPING APPARATUS AND METHOD

BACKGROUND OF THE INVENTION

1. Field of the Invention

The present invention relates generally to nuclear fuel rod production and, more particularly, is concerned with an apparatus and method for wiping the exterior surface of a loaded nuclear fuel rod to remove any uranium dust adhering thereon.

2. Description of the Prior Art

Conventional nuclear reactors include fuel elements, generally called fuel rods. The fuel rods contain fissile material and are grouped together in arrays which are organized to produce a neutron flux in the reactor core sufficient to support a high rate of nuclear fission and thus the release of a large amount of energy in the form of heat. A coolant such as water is pumped upwardly through the arrays of fuel rods in the reactor core in order to extract some of the heat for the production of useful work.

Typically, a fuel rod is composed of an elongated hollow metallic tube which contains the nuclear fuel material in the form of a stack of cylindrical fuel pellets. Since the fuel pellets ar composed of radioactive material, loading of the fuel pellets into the fuel rods must take place in a controlled area of the fuel rod production facility. Also, in view that the fuel pellets are fabricated from radioactive material in powder form, typically a certain amount of uranium powder or dust is present in the atmosphere of the controlled area due to normal handling of the fuel pellets.

Some of the airborne uranium dust will contact and adhere to the exterior of the loaded fuel rod. It is important that the dust be removed before the loaded fuel rod exists the controlled area. Heretofore, manual or hand wiping of each loaded fuel rod has been carried out. to preclude the possibility that uranium dust could be carried out of the controlled area.

Recently, to improve quality and productivity considerable efforts have been concentrated on automating fuel rod production. Consequently, a need exist for an approach to wiping loaded fuel rods which will further these overall efforts toward automation of fuel rod production.

SUMMARY OF THE INVENTION

The present invention provides a fuel rod wiping apparatus and method designed to satisfy the aforementioned needs. The objective of the wiping apparatus and method of the present invention is to remove any uranium dust adhering on the exterior surface of a fuel rod and thus preclude the possibility of the fuel rod carrying the uranium dust out of the controlled area of the fuel rod production facility. The wiping motion performed by the apparatus simulates the manual hand wiping motion which has been used heretofore to accomplish the task.

Accordingly, the present invention is directed to an apparatus for wiping an exterior surface of a tube which comprises: (a) means for moving the tube along a first path while concurrently rotating the tube about its own longitudinal axis; and (b) means for moving a web of toweling along a second path generally across the first path and into contact with the tube moving along the first path so as to perform wiping of the exterior surface of the tube. The wiping apparatus further comprises a spray chamber located adjacent an upstream end of the first path for applying a liquid spray to the tube to permit performance of a wet wiping of the tube by the web of toweling as the tube travels downstream along the first path.

More particularly, the tube moving means includes a plurality of upper tube pinch rollers each having a peripheral annular tube-engaging groove and being spaced one from the next along an upper side of the first path, and a plurality of lower tube pinch rollers each having a peripheral annular tube-engaging groove and being spaced one from the next along a lower side of the first path. The pluralities of upper and lower pinch rollers include one pair thereof being located at an infeed end of the first path and another pair thereof being located at an exit end of the first path.

The tube moving means further includes means drivingly coupled to one of the upper and lower rollers of the pairs thereof at the infeed and exit ends of the first path for rotatably driving the same to move the tube along the first path. The upper and lower/pinch rollers are canted with respect to the first path with the canting of the lower pinch rollers being the reverse of the canting of the upper pinch rollers such that rotation of the lower pinch rollers cause travel of the tube along the first path and concurrently rotating of the tube about its own axis.

Further, the toweling moving means of the wiping apparatus includes means for mounting the web of toweling in the form of a rotatable continuous roll thereof, a rotatable toweling drive roll having an exterior surface which engages the toweling roll and carries the web of toweling along the second path, and a rotatable toweling pinch roll having an exterior surface which in conjunction with the exterior surface of the drive roll pinches the web of toweling being carried on the drive roll for causing the toweling web to move about the periphery of the drive roll along the second path, across the first path and into contact with the tube. The toweling moving means further includes means drivingly coupled to the drive and pinch rolls for rotatably driving the same to move the web of toweling along the second path.

The driven roll is disposed below a pair of the upper pinch rollers for capturing the tube therebetween as the tube is moved along the first path and causing the toweling to contact the tube. The driven roll has an outer circumferential layer of yieldably resilient material which defines the outer surface of the driven roll carrying the toweling and is indented by contact with the tube for causing the toweling to wrap partially around the exterior surface of the tube as it performs wiping thereof.

The toweling roll mounting means includes a pair of arms being pivotally mounted at their upper inner ends, and a support roll rotatably mounted between the arms at their lower outer ends and supporting the roll of toweling thereon. The support roller and arms under the influence of gravity dispose the roll of toweling in engagement with the driven roll.

The present invention is also directed to a method for wiping an exterior surface of a tube. The wiping method comprises the steps of: (a) moving the tube along a first path while concurrently rotating the tube about its own longitudinal axis; (b) moving a web of toweling along a second path generally across the first path and into contact with the tube moving along the first path; and (c) establishing a region of moving contact between the moving and rotating tube and the moving toweling which performs wiping of the exterior surface of the tube.

More particularly, the moving of the web of toweling includes rotating a roll having an exterior surface which engages the web of toweling and carries the toweling along the second patn. Establishing the region of moving contact includes forcing the tube against an outer circumferential layer of yieldably resilient material of the roll which defines the exterior surface thereof carrying the toweling so as to cause indenting of the roll outer layer and the toweling carried by the exterior surface and wrapping of the toweling partially around the exterior surface of the tube as it performs wiping thereof.

Also, at a location adjacent an upstream end of the first path, the wiping method includes the step of applying a liquid spray to the tube to permit performance a wet wiping by the web of toweling as the tube travels downstream along the first path.

These and other features and advantages of the present invention will become apparent to those skilled in the art upon a reading of the following detailed description when taken in conjunction with the drawings wherein there is s own and described an illustrative embodiment of the invention.

BRIEF DESCRIPTION OF THE DRAWINGS

In the course of the following detailed description, reference will be made to the attached drawings in which:

FIG. 5 is an enlarged fragmentary front elevational view of the wiping apparatus similar to that of FIG. 3, but as seen along line 5—5 of FIG. 1.

FIG. 6 is an enlarged front elevational view of a spray chamber of the wiping apparatus as seen along line 6—6 of FIG. 2.

FIG. 7 is an enlarged fragmentary sectional view taken along line 7—7 of FIG. 2 showing the fuel rod indenting the outer surface of the towel-bearing roll as the fuel rod travels through the wiping apparatus.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 1:
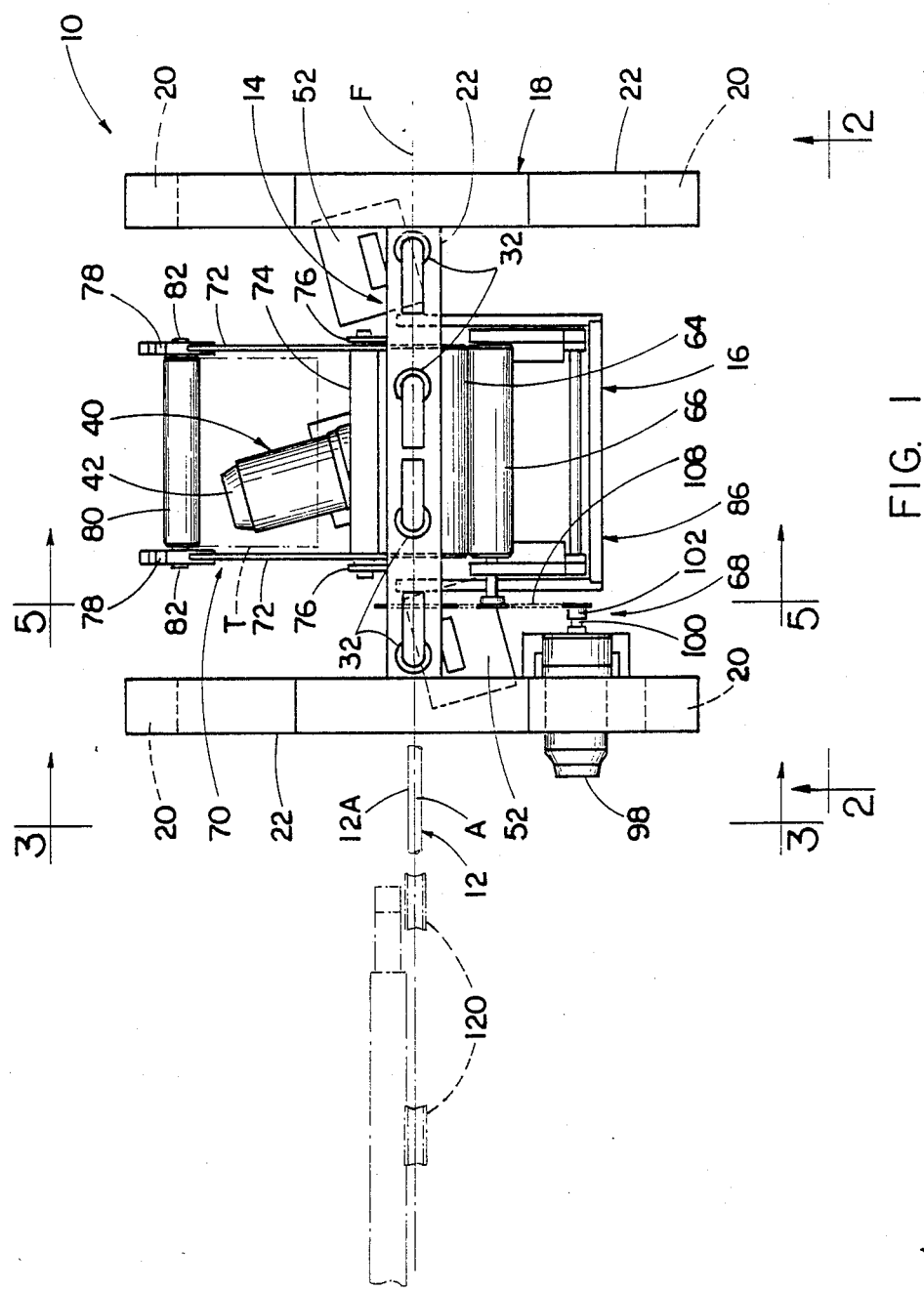
FIG. 1 is a top plan view of a nuclear fuel rod wiping apparatus of the present invention.
Figure 2:
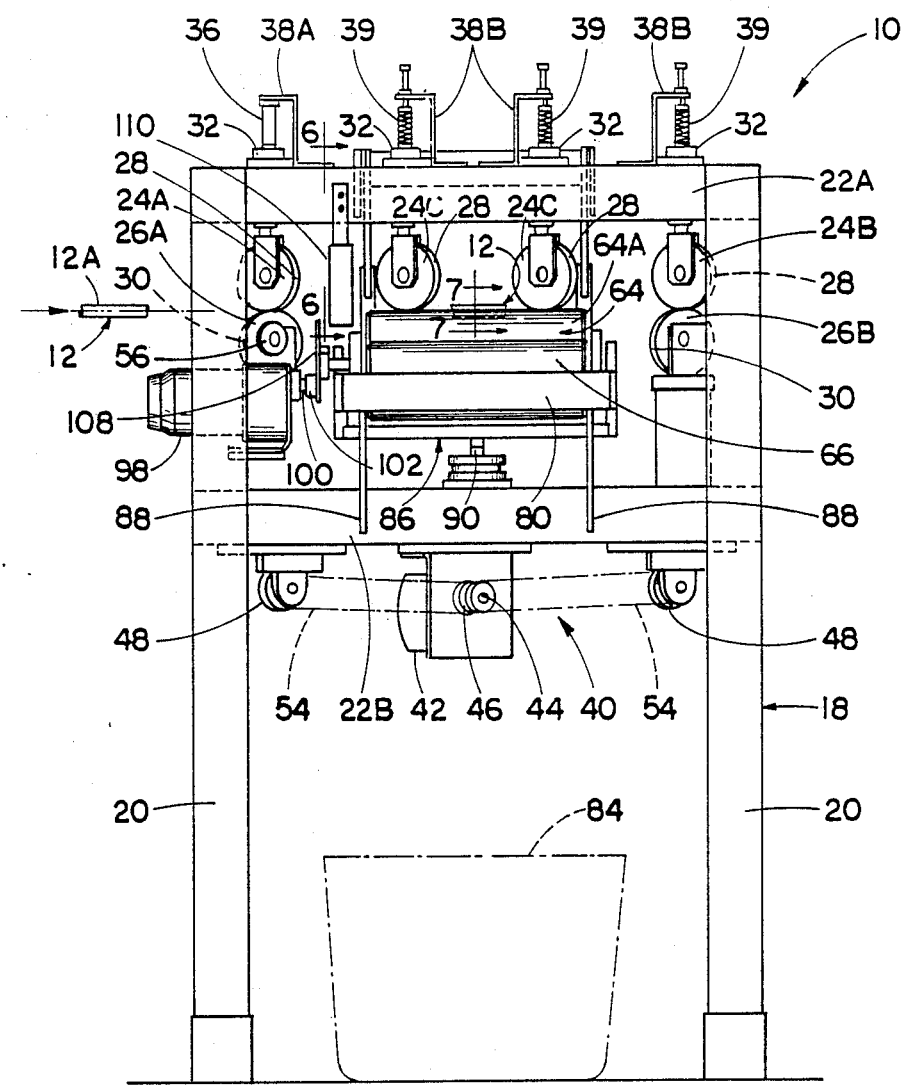
FIG. 2 is a side elevational view of the wiping apparatus as seen along line 2—2 of FIG. 1.
Figure 3:
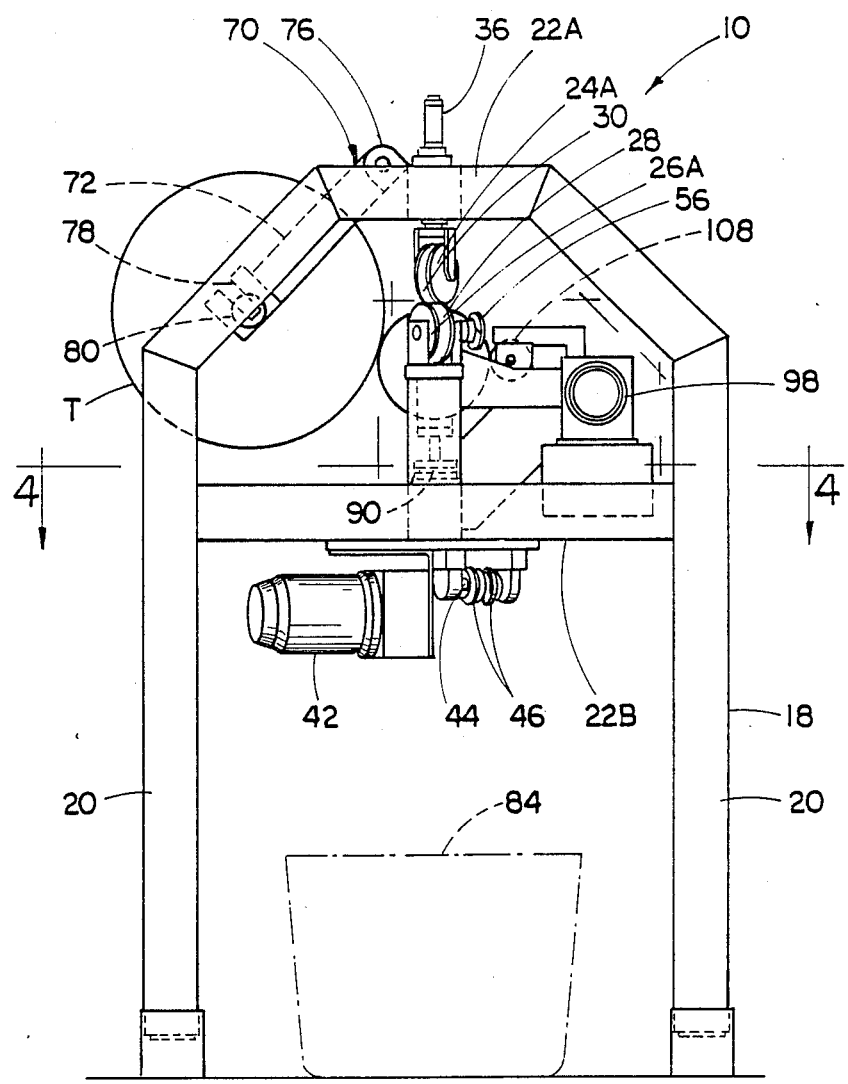
FIG. 3 is a front elevational view of the wiping apparatus as seen along line 3—3 of FIG. 1.

Referring now to the drawings, and particularly to FIGS. 1-3, there is illustrated an apparatus, generally designated 10 and constructed in accordance with the principles of the present invention, for wiping an exterior surface 12A of a tube 12, such as a nuclear fuel rod. In its basic components, the wiping apparatus 10 includes means, generally designated 14, for feeding or moving the tube 12 along a first generally linear path F while concurrently rotating the tube 12 about its own longitudinal axis A, and means, generally designated 16, for feeding or moving a web W of toweling, preferably of a cloth material, from a roll T thereof along a second path S, generally across the first path F and into contact with the tube 12, as it is moved and rotated along the first path F, so as to perform wiping of the exterior surface 12A of the tube 12. As will now be described, the tube moving means 14 and toweling moving means 16 include components which are mounted on a frame 18 of the wiping apparatus 10. The frame 18 is composed of a plurality of upright members 20 rigidly interconnected by a plurality of cross members 22.

More particularly, the tube moving means 14 includes upper and lower pluralities of tube pinch rollers 24, 26, preferably four upper rollers 24 and two lower rollers 26. Each pinch roller 24, 26 preferably has a metal core with an annular ring of yieldable resilient material fitted thereon and defining an external peripheral annular tube-engaging groove 28, 30. The upper pinch rollers 24 are vertically movably mounted by upper bracket members 32 to an upper one 22A of the cross members 22 of the frame 18 and spaced one from the next along an upper side of the firstpaath F. The pair of lower pinch rollers 26 are spaced from one another and stationarily mounted by lower bracket members 34 to an intermediate one 22B of the cross members 22 at opposite infeed and exit ends, and along a lower side, of the first path F.

The one upper pinch roller 24A located at the infeed end of the first path 18 is coupled via the one upper bracket member 32A to an actuator 36, such as an air cylinder, mounted by a bracket 38A on the frame upper member 22A. The actuator 36 is operable for moving the one upper roller 24A toward and away from the one lower roller 26A located below the upper roller 24A at the infeed end of the first path F. The opposite upper pinch roller 24B located at the exit end of the first path F and the pair of middle upper pinch rollers 24C are coupled via their respective upper bracket members 32B, 32C to springs 39 mounted by brackets 38B, 38C on the frame upper member 22A. The springs 39 bias the upper pinch rollers 24B, 24C downwardly toward the other lower pinch rollers 26B, 26C. The upper and lower pinch rollers 24, 26 are canted with respect to the first path F, with the canting of the lower pinch rollers 26 being the reverse of the canting of the upper pinch rollers 24.

Figure 4:
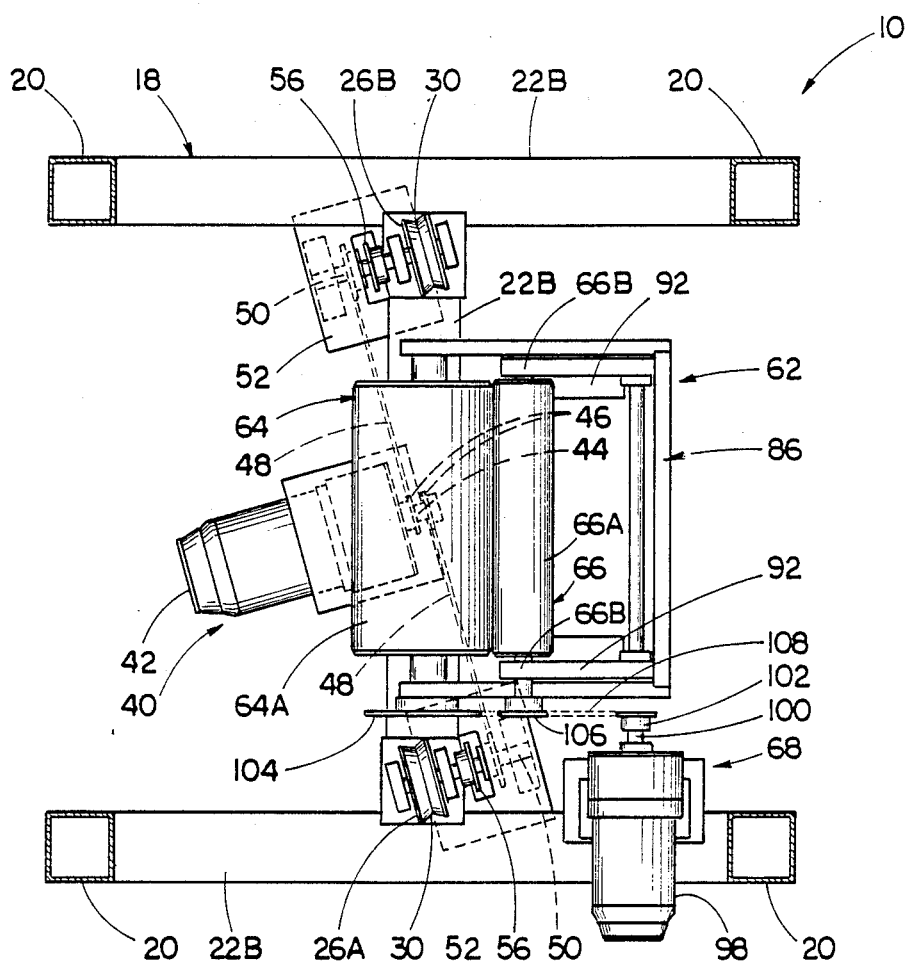
FIG. 4 is an enlarged top plan view, partly in section, of wiping apparatus as seen along line 4—4 of FIG. 3.

Further, the tube moving means 14 of the wiping apparatus 10 has drive means, generally designated 40, drivingly coupled to and transmitting rotary motion to the lower pinch rollers 26A, 26B located at the respective infeed and exit ends of the first path F. As seen in FIGS. 2-4, the drive means 40 of the tube moving means 14 includes a motor 42 having a rotary output shaft 44, a pair of drive sprockets 46 attached on the output shaft 44 for rotation therewith, first and second pairs of driven sprockets 48 (only the first pair being seen) attached on opposite ends of stub shafts 50 rotatably mounted by plates 52 to the underside of the intermediate frame cross members 2BB, and a first pair of drive chains 54 entrained about and extending between the respective drive sprockets 46 and the driven sprockets 48 of the first pair thereof. The drive means 40 also includes a third pair of driven sprockets 56 attached on a pair of stub shafts 58 rotatably mounted by upper ends of the lower bracket members 34. The lower pinch rollers 26 are also attached to the stub shafts 58. A second pair of driven chains 60 are entrained about and extend between the respective driven sprockets of the second pair thereof (not shown) and driven sprockets 56 of the third pair thereof.

Thus, the above-described components of the drive means 40 transmit rotary motion to the lower pinch rollers 26A, 26B for rotatably driving them to move the tube 12 along the first path F from the infeed end toward the exit end thereof. The driving rotation of the lower pinch rollers 26 in combination with the reverse canting of the upper and lower pinch rollers 24, 26 cause travel of the tube 12 from left to right in FIG. 1 along the first path F and concurrently therewith rotation of the tube 12 about its own axis A such that a point on the tube exterior surface 12A actually moves along a helical path as wiping thereof is performed by the toweling moving means 16.

As also seen in FIGS. 1–5, the toweling moving means 16 of the wiping apparatus 10 includes means 62 for mounting the web of toweling W in the continuous roll T, a rotatable toweling drive roll 64 for engaging the toweling roll T, a rotatable towelring pinch roll 66 for pinching the web of toweling W with the drive roll 64, and drive means 68 drivingly coupled to the drive and pinch rolls 64, 66 for rotatably driving the same to move the web of toweling W along the second path S. More particularly, the toweling roll mounting means 62 of the toweling moving means 16 includes a pivotal structure 70 having a generally U-shaped configuration and formed by a pair of parallel arms 72 and a tube 74 extending between and at fixed at its opposite ends to upper inner ends 72A of the arms 72 which also are pivotally mounted to stub brackets 76 attached to upper cross members 22A of the frame 18. The arms 72 at their lower outer ends 72B have notches 78 defined therein. The mounting means 62 also includes a support roll 80 which at its opposite ends has short stub shafts 82 which are rotatably mounted in nesting relation in the notches 78 of the lower outer ends of the arms 72.

The pivotal toweling roll mounting structure 70 thus supports the toweling support roll 80 with a side of the toweling roll T resting against the toweling drive roll 64. As the web of toweling W is paid out from the toweling roll T and the roll T decreased in diameter, the mounting structure 70 and support roll 80 pivot downward and inward toward the drive roll 64 under the influence of gravity to maintain the toweling roll T disposed in engagement with the drive roll 64.

The toweling drive roll 64 of the toweling moving means 16 at its exterior surface 64A engages the side of the toweling roll T, Then, as the drive roll 64 is rotated, it carries the web of toweling W about a portion of its periphery and along the accurate second path S where the toweling web W crosses the first path F and makes contact with the tube 12 being moved therealong. The toweling roll 66 at its exterior surface 66A in conjunction with the exterior surface 64A of the drive roll 64 pinches the web of toweling W being carried on the periphery of the drive roll 64 for causing the toweling web to move about the periphery of the drive roll 64 along the second path S where it crosses the first path F and makes contact with the tube 12 in a wiping action. After the toweling web W contacts and wipes the tube 12 as it crosses the first F, it continues along the second path S downwardly between the rolls 64, 66 and into a basket 84 located between the upright frame members 20 which collects the soiled toweling T.

As seen in FIGS. 2 and 5, the toweling drive roll 64 is disposed below middle ones of the upper pinch rollers 24C for capturing the tube 12 therebetween as the tube is moved along the first path and for causing the toweling to contact the tube. The drive and pinch rolls 64, 66 are supported by a rocker structure 86 pivotally mounted at its outer end to a pair of spaced vertical braces 88 attached to the intermediate frame cross member 22B. An actuator 90, such as an air cylinder, being mounted on the intermediate frame cross member 22B underlies and supportably contacts an inner end of the rocker structure 84. Extension and retraction of the actuator 90 respectively lifts and lowers the drive roll 64 toward and away from the middle upper pinch rollers 24C. The pinch roll 66 is mounted at its opposite ends 66B by adjustable mechanisms 92 to the rocker structure 86 for moving the pinch roll 66 toward and away from the drive roll 64 to adjust the nip 94 between the drive and pinch rolls 64, 66.

As seen in FIG. 7, the toweling drive roll 64 has an outer circumferential layer 96 of yieldably resilient material, such as polyurethene, which defines the outer surface of the drive roll which carries the web of toweling W. The drive roll 64 is lifted to its operative position toward the upper pinch roller (not shown), the material of the layer 96 indents as seen in FIG. 7 due to contact with the tube 12 which causes the web of toweling W to wrap partially around the exterior surface 12A of the tube 12 as the toweling performs wiping thereof.

Also, the drive means 68 of the toweling moving means 16 is seen in FIGS. 1–4. The drive means 68 includes a motor 98 mounted on one of the intermediate frame cross members 22B and having a rotary output shaft 100. A drive sprocket 102 is attached on the output shaft 100 for rotation therewith. Driven sprockets 104, 106 are attached to the drive and pinch rolls 64, 66 respectively. A drive chain 108 is entrained about and extends between the respective drive and driven sprockets 102–106 for transmitting rotary motion of the motor output shaft 100 to the toweling drive and pinch rolls 64, 66.

As seen in FIGS. 2 and 6, the wiping apparatus 10 further has a spray chamber 110 located adjacent an upstream end of the first path F for applying a liquid spray to the tube 12 to permit performance subsequently of a wet wiping by the web of toweling W as the tube travels downstream past the drive roll 64. The spray chamber 110 is mounted to an upper frame cross member 22A by a brace 112 and includes a box-like receptacle 114 with an opening 116 through which the tube 12 is moved and a spray nozzle 118 attached thereon and connected to a suitable source of air and water.

The tube wiping operation is initiated when the leading end of a tube 12 resting on a pair of rollers 120 located upstream of the infeed end of the first path F is sensed at the infeed end by a microswitch (not shown). The actuator 36 is operated to lower the one upper pinch roller 24A toward the one lower driven pinch roller 26A to provide driving engagement of the pinch rollers 24A, 26A with the tube 12. The tube 12 is then fed at a slow rate of speed, and concurrently rotated about its axis due to the canted relation of the upper and lower rollers 24A, 26A, along the first path F toward the toweling drive roll 64. Another microswitch (not shown) senses the arrival of the leading end of the tube 12 between the first middle upper pinch roller 26C and the toweling drive roll 64 causing operation of the actuator 90 which lifts the drive roll 64 toward the middle upper pinch rollers 26C pinching the tube therebetween.

As the rotating tube 12 moving along the first path F and the web of toweling W moving along the second path intersect, an accurate region of moving contact is established therebetween at the indented surface of the drive roll 64 where the toweling performs wiping of the exterior surface 12A of the tube 12. Due to the indenting of the drive roll surface 64A, as seen in FIG. 7 the web of toweling W wraps partially around the exterior surface 12A of the tube 12 as it performs wiping thereof.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An apparatus for wiping an exterior surface of a tube, said wiping apparatus comprising:
    (a) means for moving a tube along a first path while concurrently rotating the tube about its own longitudinal axis; and
    (b) means for moving a web of toweling along a second path generally across said first path and into contact with the tube moving along said first path so as to perform wiping of the exterior surface of the tube.

2. The wiping apparatus as recited in claim 1, wherein said tube moving means includes:
    a plurality of upper tube pinch rollers each having a peripheral annular tube-engaging groove and being spaced one from the next along an upper side of said first path; and
    a plurality of lower tube pinch rollers each having a peripheral annular tube-engaging groove and being spaced one from the next along a lower side of said first path.

3. The wiping apparatus as recited in claim 2, wherein:
    said upper pinch rollers are canted with respect to said first path; and
    said lower pinch rollers are canted with respective to said first path, said canting of said lower pinch rollers being the reverse of said canting of said upper pinch rollers.

4. The wiping apparatus as recited in claim 2, wherein said pluralities of upper and lower pinch rollers include one pair thereof being located at an infeed end of said first path and another pair thereof being located at an exit end of said first path.

5. The wiping apparatus as recited in claim 4, wherein said tube moving means also includes:
    means coupled to one of said upper and lower pinch rollers of said one pair thereof located at said infeed end of said first path and being operable for selectively moving said one roller toward and away from the other roller.

6. The wiping apparatus as recited in claim 4, wherein said tube moving means further includes:
    means drivingly coupled to one of said upper and lower rollers of said pairs thereof at said infeed and exit ends of said first path for rotatably driving the same to move the tube along said first path.

7. The wiping apparatus as recited in claim 4, wherein:
    said upper pinch rollers are canted with respect to said first path; and
    said lower pinch rollers are canted with respective to said first path, said canting of said lower pinch rollers being the reverse of said canting of said upper pinch rollers such that rotation of said lower pinch rollers causes travel of the tube along said first path and concurrently rotation of the tube about its own axis.

8. The wiping apparatus as recited in claim 1, wherein said toweling moving means includes:
    means for mounting the web of toweling in the form of a rotatable continuous roll thereof;
    a rotatable toweling drive roll having an exterior surface which engages said toweling roll and carries the web of toweling along said second path; and
    a rotatable toweling pinch roll having an exterior surface which in conjunction with said exterior surface of said drive roll pinches the web of toweling being carried on said drive roll for causing the toweling web to move about the periphery of said drive roll along said second path, across said first path and into contact with the tube.

9. The wiping apparatus as recited in claim 8, wherein said toweling moving means further includes:
    means drivingly coupled to said drive and pinch rolls for rotatably driving the same to move the web of toweling along said second path.

10. The wiping apparatus as recited in claim 8, wherein said tube moving means includes:
    a plurality of upper tube pinch rollers each having a peripheral annular tube-engaging groove and being spaced one from the next along an upper side of said first path; and
    a plurality of lower tube pinch rollers each having a peripheral annular tube-engaging groove and being spaced one from the next along a lower side of said first path.

11. The wiping apparatus as recited in claim 10, wherein said toweling drive roll is disposed below a pair of said upper pinch rollers for capturing the tube therebetween as the tube is moved along said first path and causing the toweling to contact the tube.

12. The wiping apparatus as recited in claim 11, wherein said toweling moving means also includes:
    means mounting said toweling drive roll for movement toward and away from said pair of upper pinch rollers.

13. The wiping apparatus as recited in claim 11, wherein said toweling drive roll has an outer circumferential layer of yieldably resilient material which defines said exterior surface of said drive roll carrying the toweling and is capable of being indented by contact with the tube for causing the toweling to wrap partially around the exterior surface of the tube as it performs wiping thereof.

14. The wiping apparatus as recited in claim 8, wherein said toweling roll mounting means includes:
    a pair of arms being pivotally mounted at their upper inner ends; and
    a support roll rotatably mounted between said arms at their lower outer ends and supporting the roll of toweling thereon, said support roller and arms under the influence of gravity disposing the roll of toweling in engagement with said drive roll.

15. The wiping apparatus as recited in claim 1, further comprising:
a spray chamber located adjacent an upstream end of said first path for applying a liquid spray to the tube to permit performance subsequently of a wet wiping by the web of toweling as the tube travels downstream along said first path.

16. An apparatus for wiping an exterior surface of a tube for removing any foreign matter adhered thereon, said wiping apparatus comprising:
(a) means for moving a tube along a first path while concurrently rotating the tube about its own longitudinal axis, said tube moving means includes
  (i) a plurality of upper tube pinch rollers each having a peripheral annular tube-engaging groove and being spaced one from the next along an upper side of said first path,
  (ii) a plurality of lower tube pinch rollers each having a peripheral annular tube-engaging groove and being spaced one from the next along a lower side of said first path,
  (iii) said pluralities of upper and lower pinch rollers including one pair thereof being located at an infeed end of said first path and another pair thereof being located at an exit end of said first path; and
  (vi) means drivingly coupled to one of said upper and lower rollers of said pairs thereof at said infeed and exit ends of said first path for rotatably driving the sam e to move the tube along said first path,
  (v) said upper and lower pinch rollers being canted with respect to said first path, said canting of said lower pinch rollers being the reverse of said canting of said upper pinch rollers such that rotation of said lower pinch rollers causes travel of the tube along said first path and concurrently rotation of the tube about its own axis; and
(b) means for moving a web of toweling along a second path generally across said first path and into contact with the tube moving along said first path so as to perform wiping of the exterior surface of the tube.

17. The wiping apparatus as recited in claim 16, wherein said toweling moving means includes:
means for mounting the web of toweling in the form of a rotatable continuous roll thereof;
a rotatable toweling drive roll having an exterior surface which engages said toweling roll and carries the web of toweling along said second path; and
a rotatable toweling pinch roll having an exterior surface which in conjunction with said exterior surface of said drive roll pinches the web of toweling being carried on said drive roll for causing the toweling web to move about the periphery of said drive roll along said second path, across said first path and into contact with the tube.

18. The wiping apparatus as recited in claim 17, wherein said toweling moving means further includes:
means drivingly coupled to said drive and pinch rolls for rotatably driving the same to move the web of toweling along said second path.

19. The wiping apparatus as recited in claim 17, wherein said toweling drive roll is disposed below a pair of said upper pinch rollers for capturing the tube therebetween as the tube is moved along said first path and causing the toweling to contact the tube.

20. The wiping apparatus as recited in claim 19, wherein said toweling drive roll has an outer circumferential layer of yieldably resilient material which defines said exterior surface of said drive roll carrying the toweling and is capable of being indented by contact with the tube for causing the toweling to wrap partially around the exterior surface of the tube as it performs wiping thereof.

21. The wiping apparatus as recited in claim 17, wherein said toweling roll mounting means includes:
a pair of arms being pivotally mounted at their upper inner ends; and
a support roll rotatably mounted between said arms at their lower outer ends and supporting the roll of toweling thereon, said support roller and arms under the influence of gravity disposing the roll of toweling in engagement with said drive roll.

22. The wiping apparatus as recited in claim 16, further comprising:
a spray chamber located adjacent an upstream end of said first path for applying a liquid spray to the tube to permit performance subsequently of a wet wiping by the web of toweling as the tube travels downstream along said first path.

23. A method for wiping an exterior surface of a tube, said wiping method comprising the steps of:
(a) moving the tube along a first path while concurrently rotating the tube about its own longitudinal axis;
(b) moving a web of toweling along a second path generally across said first path and into contact with the tube moving along said first path; and
(c) establishing a region of moving contact between the moving and rotating tube and the moving toweling which performs wiping of the exterior surface of the tube.

24. The wiping method as recited in claim 23, wherein said moving of the web of toweling includes:
rotating a roll having an exterior surface which engages the web of toweling and carries the toweling along said second path.

25. The wiping method as recited in claim 24, wherein said establishing the region of moving contact includes:
forcing the tube against an outer circumferential layer of yieldably resilient material of the roll which defines the exterior surface thereof carrying the toweling so as to cause indenting of the roll outer layer and the toweling carried by the exterior surface and wrapping of the toweling partially around the exterior surface of the tube as it performs wiping thereof.

26. The wiping method as recited in claim 23, further comprising the step of:
at a location adjacent an upstream end of the first path applying a liquid spray to the tube to permit performance a wet wiping by the web of toweling as the tube travels downstream along the first path.

* * * * *